(12) United States Patent
Hasegawa et al.

(10) Patent No.: US 8,457,459 B2
(45) Date of Patent: Jun. 4, 2013

(54) ARRAYED-WAVEGUIDE-GRATING-TYPE OPTICAL MULTIPLEXER/DEMULTIPLEXER

(75) Inventors: Junichi Hasegawa, Tokyo (JP); Kazutaka Nara, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 336 days.

(21) Appl. No.: 12/831,662

(22) Filed: Jul. 7, 2010

(65) Prior Publication Data
US 2011/0008002 A1  Jan. 13, 2011

(30) Foreign Application Priority Data

Jul. 8, 2009 (JP) .................................. 2009-161939
Apr. 26, 2010 (JP) .................................. 2010-101163

(51) Int. Cl.
*G02B 6/26* (2006.01)
*G02B 6/42* (2006.01)

(52) U.S. Cl.
USPC .................................. 385/39; 385/14; 385/37

(58) Field of Classification Search
None
See application file for complete search history.

(56) References Cited

U.S. PATENT DOCUMENTS

| | | | | |
|---|---|---|---|---|
| 5,905,824 A * | 5/1999 | Delisle et al. | ............... | 385/15 |
| 6,668,116 B2 * | 12/2003 | Kashihara et al. | ............... | 385/37 |
| 6,788,848 B2 * | 9/2004 | Yoneda | ............... | 385/37 |
| 6,826,332 B2 * | 11/2004 | Saito et al. | ............... | 385/37 |
| 6,954,566 B2 * | 10/2005 | Johannessen | ............... | 385/37 |
| 6,975,793 B2 * | 12/2005 | Cole et al. | ............... | 385/33 |
| 7,062,127 B2 * | 6/2006 | Purchase et al. | ............... | 385/37 |
| 7,447,394 B2 * | 11/2008 | Ho et al. | ............... | 385/14 |
| 7,539,364 B2 * | 5/2009 | Cole et al. | ............... | 385/14 |
| 7,539,368 B2 * | 5/2009 | Hasegawa et al. | ............... | 385/14 |
| 7,912,330 B2 * | 3/2011 | Rhee et al. | ............... | 385/37 |
| 7,965,912 B2 * | 6/2011 | Rhee et al. | ............... | 385/37 |
| 2001/0033714 A1 * | 10/2001 | Delisle et al. | ............... | 385/33 |
| 2008/0135169 A1 * | 6/2008 | Rhee et al. | ............... | 156/256 |
| 2011/0085761 A1 | 4/2011 | Nara et al. | | |

FOREIGN PATENT DOCUMENTS

JP  2006-284632  10/2006

OTHER PUBLICATIONS

U.S. Appl. No. 13/361,285, filed Jan. 30, 2012, Hasegawa, et al.
U.S. Appl. No. 13/364,675, filed Feb. 2, 2012, Hasegawa, et al.

* cited by examiner

*Primary Examiner* — Tina Wong
(74) *Attorney, Agent, or Firm* — Oblon, Spivak, McClelland, Maier & Neustadt, L.L.P.

(57) ABSTRACT

A multiplexer/demultiplexer includes: a waveguide chip including a first chip and a second chip that are divided by a plane and obtained by cutting, together with a substrate, in a direction crossing an optical axis, a first slab waveguide of an AWG including the first slab waveguide and a second slab waveguide that are formed on the substrate; a first base to which the first chip is fixed; a second base separated from the first base and to which the second chip is fixed; and a member that has one end fixed to the first base or chip and another end fixed to the second base or chip, in a state in which cut surfaces of the first and second chips face each other, and that is configured to move the first base and the second base relatively to each other along the plane by expanding/contracting when temperature changes.

10 Claims, 6 Drawing Sheets

FIG.5

| | | |
|---|---|---|
| CHANNEL SPACING [GHz] | | 100 |
| CHANNEL NUMBER | | 40 |
| FOCAL LENGTH OF SLAB WAVEGUIDE [mm] | $L_f$ | 17.2 |
| DIFFRACTION ORDER | m | 29 |
| PITCH OF ADJACENT ARRAYED WAVEGUIDE [$\mu$m] | d | 13.8 |
| PATH LENGTH DIFFERENCE OF ARRAYED WAVEGUIDE [$\mu$m] | $\Delta L$ | 31.0 |
| GROUP INDEX OF ARRAYED WAVEGUIDE AT R.T. | $n_g$ | 1.4760 |
| EFFECTIVE INDEX OF SLAB WAVEGUIDE AT R.T. | $n_s$ | 1.4537 |

ARRAYED-WAVEGUIDE-GRATING-TYPE OPTICAL MULTIPLEXER/DEMULTIPLEXER

CROSS-REFERENCE TO RELATED APPLICATIONS

This application is based upon and claims the benefit of priority from Japanese Patent Application No. 2009-161939 filed on Jul. 8, 2009, and Japanese Patent Application No. 2010-101163 filed on Apr. 26, 2010; the entire contents of which are incorporated herein by reference.

BACKGROUND OF THE INVENTION

1. Field of the Invention

The present invention relates to an arrayed-waveguide-grating-type optical multiplexer/demultiplexer having a function of a wavelength multiplexer/demultiplexer that puts together beams of different wavelengths in one or performs division per wavelength, and more particularly to an athermalized (temperature independent) arrayed-waveguide-grating-type optical multiplexer/demultiplexer.

2. Description of the Related Art

In arrayed waveguide gratings (AWG) having an important role as wavelength multiplexer/demultiplexers (multiplexing/demultiplexing), the refractive index of light in quartz glass has temperature dependency, and thus temperature dependency is also seen in the center wavelengths (transmission center wavelengths).

The temperature dependency of center wavelengths of AWGs made of quartz glass is 0.011 nm/° C., and this is a large value not negligible to be used in dense-wavelength division multiplexing (D-WDM) transmission systems.

Therefore, in recent years, for D-WDM transmission systems, which have been progressively diversified, athermalization (temperature independency) of AWGs, which does not require power sources, has been strongly demanded.

Conventionally, in Japanese Patent Application Laid-Open No. 2006-284632, an arrayed-waveguide-grating-type optical multiplexer/demultiplexer (athermal AWG module), which is designed to be athermalized using a compensation plate, has been described (see FIG. 6). An optical multiplexer/demultiplexer 100 of an arrayed waveguide grating illustrated in FIG. 6 has an input waveguide 102 formed on a waveguide chip 114, an input slab waveguide 104 connected to the input waveguide 102, an output waveguide 106, an output slab waveguide 108 connected to the output waveguide 106, and an arrayed waveguide 110 that connects the input slab waveguide 104 and the output slab waveguide 108.

The optical multiplexer/demultiplexer 100 of the arrayed waveguide grating is cut into two at the input slab waveguide 104, to be divided into a first part 116 including one part 104A of the input slab waveguide 104, and a second part 118 including the other part 104B of the input slab waveguide 104.

The first part 116 is connected to the second part 118 by a compensation plate 112. With this configuration, the compensation plate 112 expands and contracts by changes in temperature, and corrects the wavelength shifted due to the temperature changes by moving the one part 104A of the input slab waveguide 104.

With this configuration, light of the same wavelength as that of light input to the output waveguide 106 is able to be output from the input waveguide 102 even if the temperature changes.

However, because in the conventional structure illustrated in FIG. 6, it is required to provide space for sticking the compensation plate 112 on the waveguide chip 114, it is required to consider the space for sticking the compensation plate 112 to determine the shape of the waveguide chip 114. Therefore, the size of the waveguide chip 114 becomes large, the number of waveguide chips 114 that are taken per wafer becomes limited, and thus the manufacturing cost becomes high.

SUMMARY OF THE INVENTION

It is an object of the present invention to at least partially solve the problems in the conventional technology.

According to an aspect of the present invention, an arrayed-waveguide-grating-type optical multiplexer/demultiplexer includes: a waveguide chip including a first waveguide chip and a second waveguide chip that are divided by a cut plane and obtained by cutting, together with a substrate, in a direction crossing an optical axis, a first slab waveguide of an arrayed waveguide grating including the first slab waveguide and a second slab waveguide that are formed on the substrate; a first base to which the first waveguide chip is fixed; a second base separated from the first base and to which the second waveguide chip is fixed; and a compensation member that has one end fixed to the first base or the first waveguide chip and another end fixed to the second base, in a state in which a cut surface of the first waveguide chip and a cut surface of the second waveguide chip face each other, and that is configured to move the first base and the second base relatively to each other along the cut plane by expanding or contracting when temperature changes.

According to another aspect of the present invention, an arrayed-waveguide-grating-type optical multiplexer/demultiplexer, includes: a waveguide chip including a first waveguide chip and a second waveguide chip that are divided by a cut plane and obtained by cutting, together with a substrate, in a direction crossing an optical axis, a first slab waveguide of an arrayed waveguide grating including the first slab waveguide and a second slab waveguide that are formed on the substrate; a first base to which the first waveguide chip is fixed; a second base separated from the first base and to which the second waveguide chip is fixed; and a compensation member that has one end fixed to the first base and another end fixed to the second base or the second waveguide chip, in a state in which a cut surface of the first waveguide chip and a cut surface of the second waveguide chip face each other, and that is configured to move the first base and the second base relatively to each other along the cut plane by expanding or contracting when temperature changes.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 depicts circuit parameters of an AWG used to determine a length of a compensation plate used in the arrayed-waveguide-grating-type optical multiplexer/demultiplexer according the embodiment;

DETAILED DESCRIPTION OF THE PREFERRED EMBODIMENTS

An example of an arrayed-waveguide-grating-type optical multiplexer/demultiplexer according to the present invention will be explained below with reference to FIGS. 1A to 5.
(Configuration)

Figure 1A:
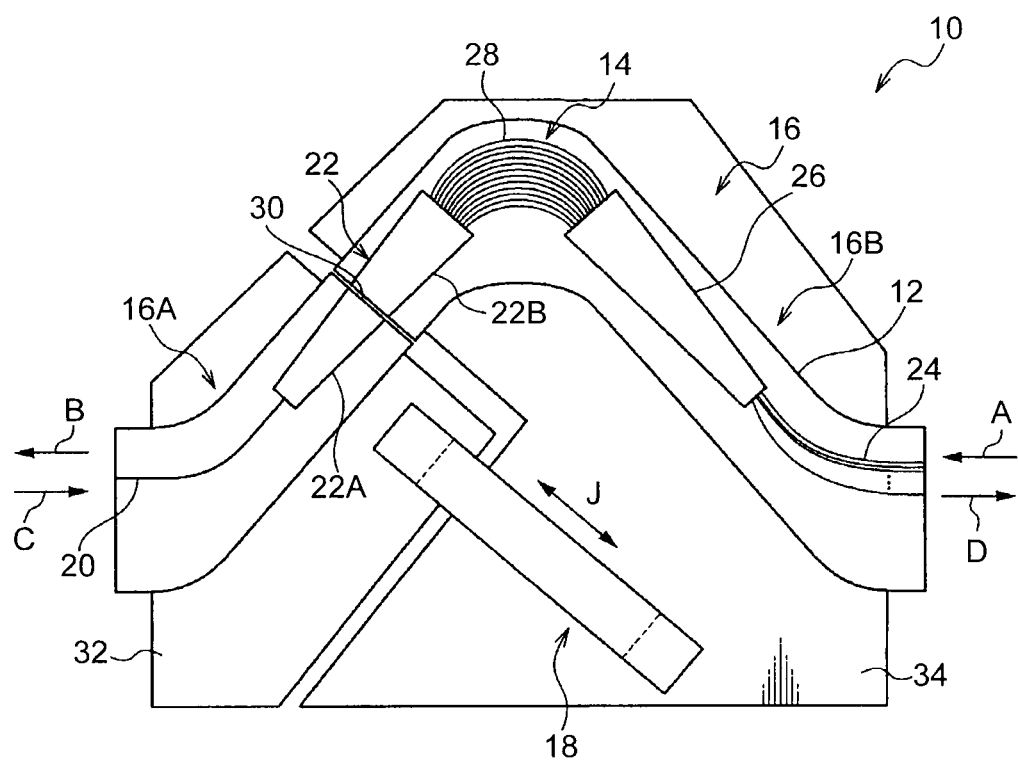
FIGS. 1A and 1B are respectively a plan view and a cross-sectional view of an arrayed-waveguide-grating-type optical multiplexer/demultiplexer according to an embodiment of the present invention.
Figure 1B:
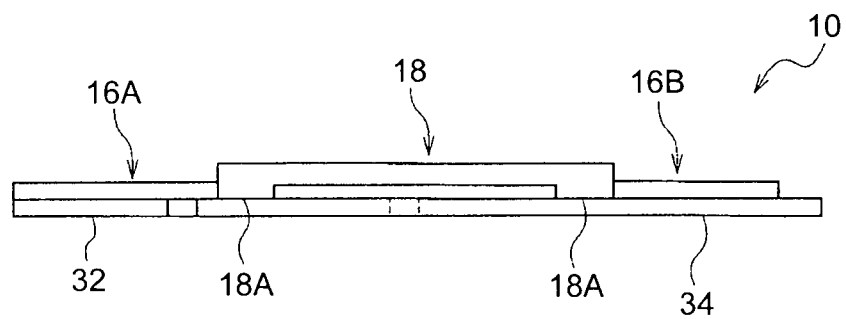
Figure 2:
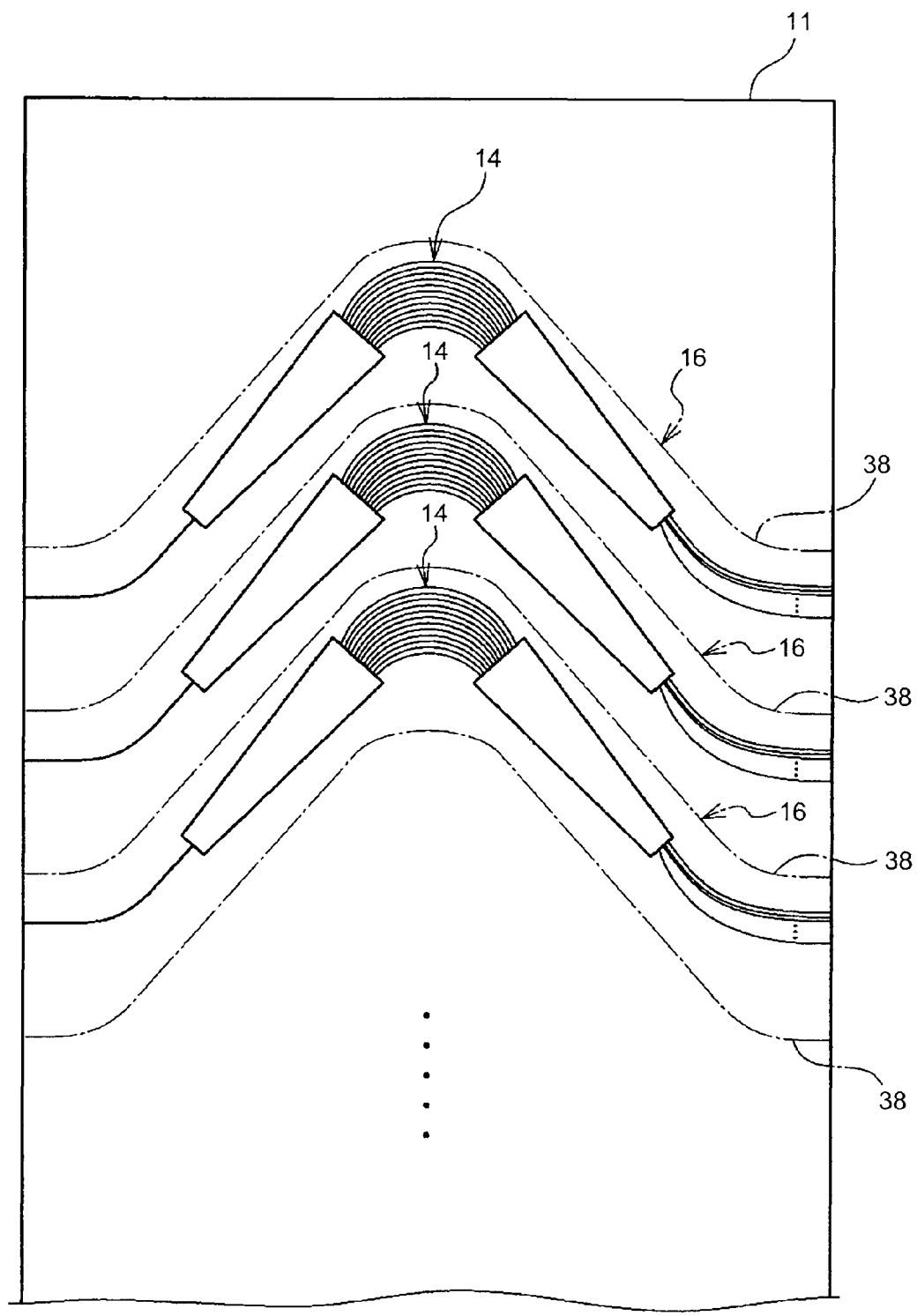
FIG. 2 is a plan view of a part of a wafer in which waveguide chips used in the arrayed-waveguide-grating-type optical multiplexer/demultiplexer according the embodiment are formed.
Figure 3:
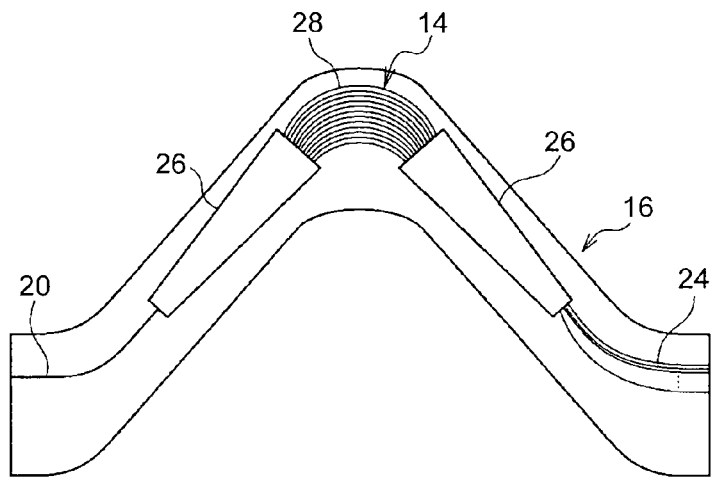
FIG. 3 is a plan view of a waveguide chip used in the arrayed-waveguide-grating-type optical multiplexer/demultiplexer according the embodiment.

FIG. 1A is a plan view of an optical multiplexer/demultiplexer 10 of an arrayed waveguide grating (hereinafter, "the AWG optical multiplexer/demultiplexer 10") according to an embodiment of the present invention, and FIG. 1B is a side view of the AWG optical multiplexer/demultiplexer 10. FIG. 2 is a plan view of a part of a wafer 11 in which many arrayed waveguide gratings (AWGs) are formed. FIG. 3 is a plan view of an arrayed waveguide grating (AWG) cut out from the wafer 11 illustrated in FIG. 2.

As illustrated in FIGS. 1A and 1B, the AWG optical multiplexer/demultiplexer 10 used in an athermalized (temperature independent) AWG module is formed with an arrayed waveguide grating (AWG) 14 on a silicon substrate 12. The AWG 14 includes an input slab waveguide 22.

A waveguide chip 16 including the AWG 14 is divided into a first waveguide chip 16A and a second waveguide chip 16B by a cut plane 30, by cutting the input slab waveguide 22 portion together with the silicon substrate 12 in a direction orthogonal to an optical axis (a center line) of the input slab waveguide 22.

Specifically, the AWG 14 includes an input waveguide 20, the input slab waveguide 22, which is a first slab waveguide and connected to the input waveguide 20, plural output waveguides 24, an output slab waveguide 26, which is a second slab waveguide and connected to the output waveguide 24, and an arrayed waveguide 28 that connects the input slab waveguide 22 and the output slab waveguide 26.

That is, a facet of the input waveguide 20 is connected to an input side facet of the input slab waveguide 22, and one facet of plural waveguides constituting the arrayed waveguide 28 is connected to an output side facet of the input slab waveguide 22.

Further, the other facet of the arrayed waveguide 28 is connected to an input side facet of the output slab waveguide 26, and a facet of the plural output waveguides 24 is connected to an output side facet of the output slab waveguide 26.

The AWG 14 is a planar lightwave circuit (PLC) in which an optical waveguide, which is made of a core and a cladding formed by combining a flame hydrolysis deposition (FHD) method, an optical fiber manufacturing technique, and a semiconductor micromachining technique, is formed on the silicon substrate 12. As the substrate, a quartz substrate may be used instead of a silicon substrate.

An external form of the waveguide chip 16 is of boomerang shape formed by cutting in a curved line along the outline of the AWG 14.

The first waveguide chip 16A includes a separated slab waveguide 22A, which is one part of the cut input slab waveguide 22, as well as the input waveguide 20 connected to the separated slab waveguide 22A. The second waveguide chip 16B includes a separated slab waveguide 22B, which is the other part of the cut input slab waveguide 22, as well as the arrayed waveguide 28, the output slab waveguide 26, and the output waveguide 24.

The first waveguide chip 16A is fixed to a first glass plate 32, which is made of quartz and is a tabular first base. A second glass plate 34 made of quartz is also provided, which is a tabular second base separated from the first glass plate 32. To the second glass plate 34, the second waveguide chip 16B arranged to face the first waveguide chip 16A at the cut plane 30 is fixed. Specifically, the second waveguide chip 16B, excluding a part where the arrayed waveguide 28 of the second waveguide chip 16B is formed, is fixed to the second glass plate 34.

Further, a rectangular compensation plate 18 is provided to stride across the first glass plate 32 and the second glass plate 34. One end of the compensation plate 18 is fixed to an upper surface of the first glass plate 32 with, for example, an ultraviolet cure adhesive (a UV adhesive) in the present embodiment, and the other end of the compensation plate 18 is fixed to an upper surface of the second glass plate 34 with, for example, an ultraviolet cure adhesive (a UV adhesive) in the present embodiment. The compensation plate 18 is arranged such that a long side (a longitudinal direction) of the compensation plate 18 is parallel to a direction in which the cut plane 30 extends. Specifically, legs 18A projects from both end portions of the compensation plate 18, and are fixed to the first glass plate 32 and the second glass plate 34 with the ultraviolet cure adhesive. Accordingly, areas to adhere the first glass plate 32 and the second glass plate 34 are determinable.

In this manner, the first glass plate 32 and the second glass plate 34 are positioned using the ultraviolet cure adhesive, and thereafter ultraviolet light is irradiated to parts to be adhered between the legs 18A of the compensation plate 18 and the first and second glass plates 32 and 34 from a surface opposite to a surface on which the compensation plate 18 is mounted. Consequently, the ultraviolet cure adhesive is cured, and a compensation member and the first and second bases are fixed together.

In the present embodiment, the compensation plate 18 is a metal plate made of copper or pure aluminum (JIS: A1050).

A length of the compensation plate 18 is calculated by the following equation (Equation 1) using circuit parameters of the AWG listed in FIG. 5, and in the present embodiment, the length is calculated to be 18 millimeters.

$$dx = \frac{L_f \Delta L}{n_s d\lambda_o} n_g \frac{d\lambda}{dT} \quad (1)$$

Based on this configuration, a light collecting position by the input slab waveguide 22 (a light collecting position by the separated slab waveguide 22A of the input slab waveguide 22) changes by dx when the temperature changes. However, because the compensation plate 18 expands or contracts by dx due to the temperature change, the first glass plate 32 and the second glass plate 34 move relatively to each other along the cut plane 30. Accordingly, the separated slab waveguide 22A also moves relatively to the separated slab waveguide 22B along the cut plane 30. As a result, the light collecting position of the input slab waveguide 22 is corrected (dx−dx=0).

A manufacturing process of the AWG optical multiplexer/demultiplexer 10 according to the embodiment is briefly explained below.

As illustrated in FIG. 2, when manufacturing the waveguide chips 16, each of which becomes the first waveguide chip 16A and the second waveguide chip 16B by being cut into two, plural AWGs 14 are first formed in a condensed manner on one wafer 11 to increase the number of the waveguide chips 16 taken per wafer.

Next, the plural AWGs 14 formed on the one wafer 11 are cut into curved-lined forms along cut lines 38, which are outlines of the AWGs 14, by using a laser beam machine (such as a $CO_2$ laser beam machine). As illustrated in FIG. 3, as a result of this cutting, an external form of the silicon substrate 12 of the waveguide chip 16 becomes boomerang-like-shaped.

After manufacturing the waveguide chips 16, each waveguide chip 16 is divided into the first waveguide chip 16A and the second waveguide chip 16B (see FIGS. 1A and 1B) by cutting the input slab waveguide 22 portion together with the silicon substrate 12 in a direction orthogonal to an optical axis (a center line) of the input slab waveguide 22. A chip is fixed to a quartz glass plate, and the compensation plate 18 is mounted so that a center wavelength of the arrayed wavelength grating corresponds to the waveform of the ITU-T grid.

Next, one end of the compensation plate 18 is fixed to an upper surface of the first glass plate 32 with an adhesive and the other end is fixed to an upper surface of the second glass plate 34 with an adhesive such that a long side of the compensation plate 18 becomes parallel to the direction in which the cut plane 30 extends. As a result, the AWG optical multiplexer/demultiplexer 10 is manufactured.

Operations of the AWG optical multiplexer/demultiplexer 10 are explained next.

As illustrated in FIG. 1A, when used as a multiplexer (MUX), an optical signal is input as indicated by an arrow A, and output as indicated by an arrow B. That is, plural optical signals of different wavelengths ($\lambda 1$ to $\lambda n$) are individually input from respective waveguides of the output waveguide 24, and these optical signals are multiplexed and output from the input waveguide 20.

In this case, a light collecting position by the input slab waveguide 22 (a light collecting position by the separated slab waveguide 22B of the input slab waveguide 22) changes as the temperature changes, but the separated slab waveguide 22A moves relatively to the separated slab waveguide 22B due to expansion or contraction of the compensation plate 18, thereby correcting the light collecting position. Therefore, optical signals of the same wavelengths are able to be output from the input waveguide 20 even if the temperature changes. That is, plural optical signals having the same wavelengths ($\lambda 1$ to $\lambda n$) as those ($\lambda 1$ to $\lambda n$) of input plural optical signals are output, having been multiplexed, from the input waveguide 20.

When used as a demultiplexer (DEMUX), an optical signal is input as indicated by an arrow C, and output as indicated by an arrow D. That is, an optical signal obtained by multiplexing plural optical signals of different wavelengths ($\lambda 1$ to $\lambda n$) is input to the input waveguide 20, and is output demultiplexed into individual wavelengths ($\lambda 1$ to $\lambda n$) from the output waveguide 24.

In this case, the light collecting position by the input slab waveguide 22 (the light collecting position by the separated slab waveguide 22A of the input slab waveguide 22) changes as the temperature changes, but the separated slab waveguide 22A moves relatively to the separated slab waveguide 22B due to expansion or contraction of the compensation plate 18, thereby correcting the light collecting position. Therefore, optical signals of the same wavelengths are able to be output from the output waveguide 24 even when the temperature changes. That is, plural optical signals having the same wavelength ($\lambda 1$ to $\lambda n$) as those of the corresponding input plural optical signal ($\lambda 1$ to $\lambda n$) are individually output from respective waveguides of the output waveguide 24.

The AWG optical multiplexer/demultiplexer 10 according to the present embodiment was actually manufactured, and a temperature characteristic of the AWG optical multiplexer/demultiplexer 10 was evaluated.

Figure 4:
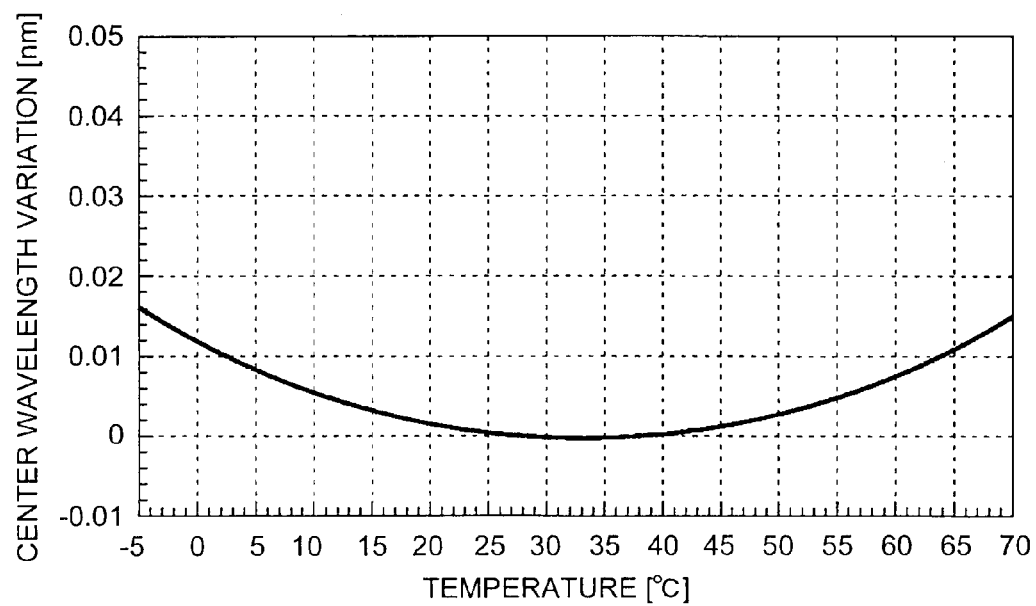
FIG. 4 depicts an evaluation result of a temperature characteristic of the arrayed-waveguide-grating-type optical multiplexer/demultiplexer according the embodiment.
Figure 6:
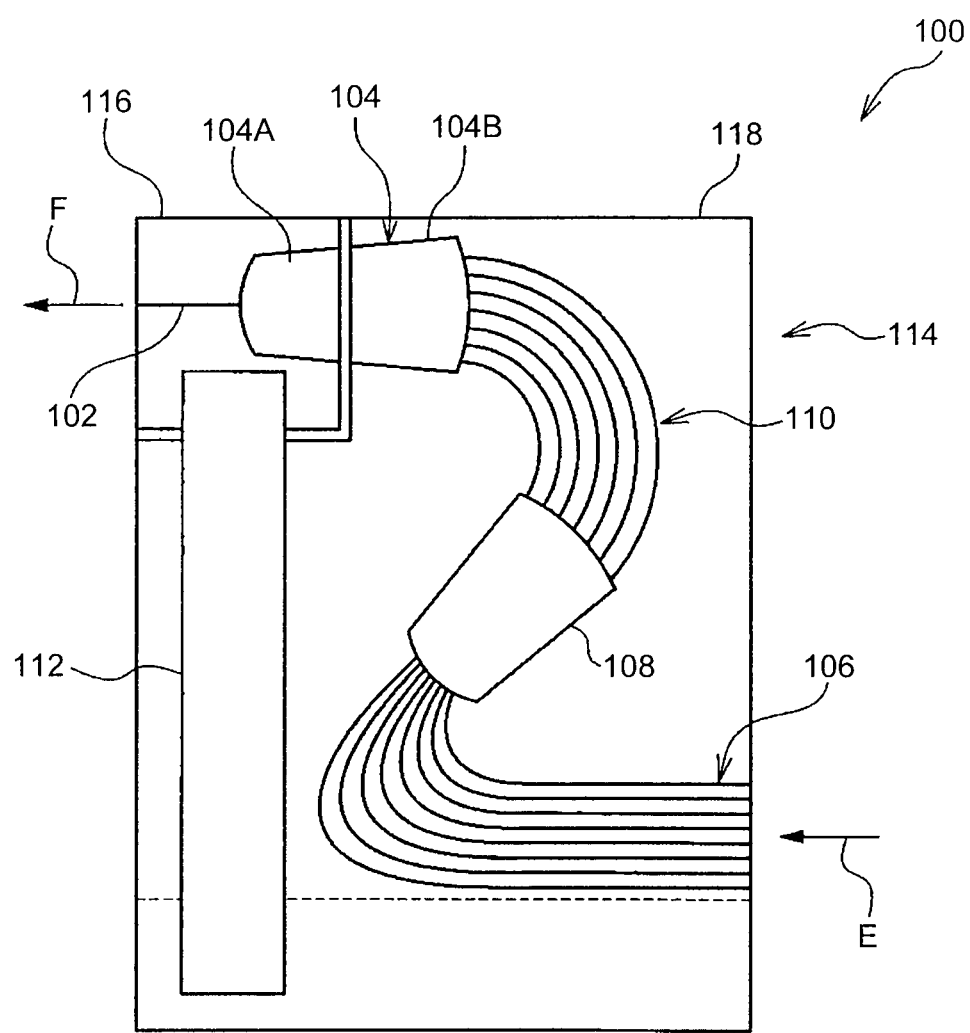
FIG. 6 is a plan view of a conventional arrayed-waveguide-grating-type optical multiplexer/demultiplexer as a comparative example of the arrayed-waveguide-grating-type optical multiplexer/demultiplexer according the embodiment.

As illustrated in FIG. 4, within a temperature range of $-5°$ C. to $70°$ C., a center wavelength variation of $\pm 0.010$ nm was able to be achieved, and it was confirmed that this had no problem for practical uses.

The AWG optical multiplexer/demultiplexer 10 according to the present embodiment with the second waveguide chip 16B, excluding a part on which the arrayed waveguide 28 of the second waveguide chip 16B was formed, being fixed to the second glass plate 34, and an AWG optical multiplexer/demultiplexer having an arrayed waveguide also adhered to a second glass plate as a comparative example were manufactured, and their spectra over temperature were checked.

Figure 7A:
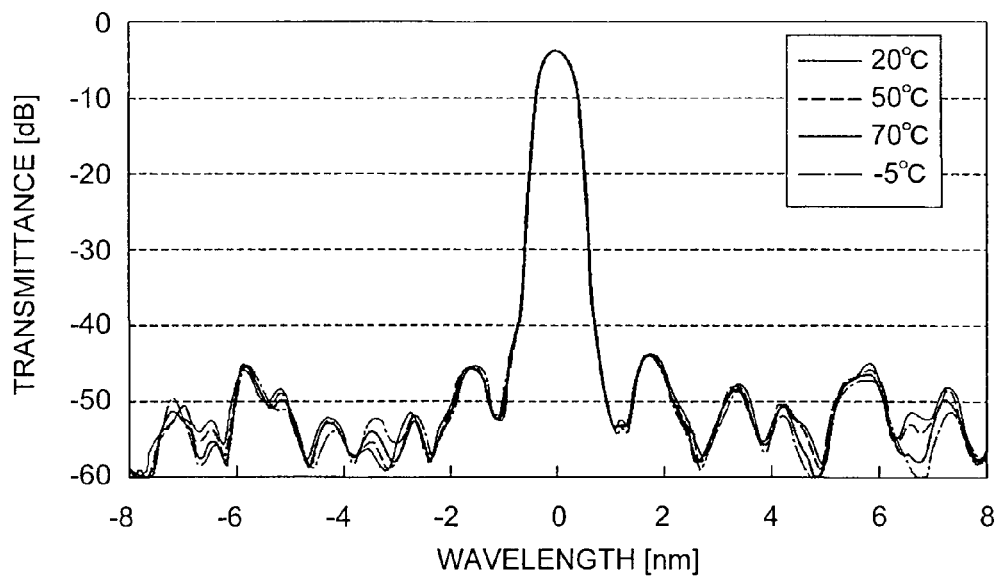
FIGS. 7A and 7B are respectively a graph of a spectrum over temperature of the arrayed-waveguide-grating-type optical multiplexer/demultiplexer according the embodiment, and a graph of a spectrum over temperature of the comparative example.
Figure 7B:
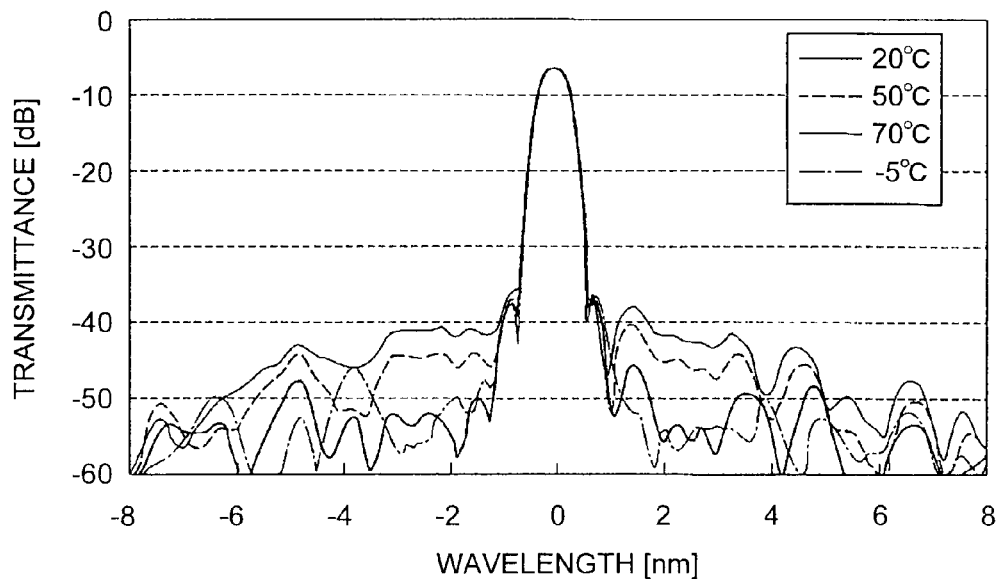

FIG. 7A depicts a spectrum of the AWG optical multiplexer/demultiplexer 10 according to the present embodiment, and FIG. 7B depicts a spectrum of the AWG optical multiplexer/demultiplexer as the comparative example.

It is understood that the AWG optical multiplexer/demultiplexer as the comparative example does not have a large problem at $20°$ C., but distortion in the spectrum for each temperature is different and there is large crosstalk. On the contrary, in the AWG optical multiplexer/demultiplexer 10 according to the present embodiment, distortion in the spectrum is stable regardless of the temperature, and low noise level is stably obtained even when the temperature changes. Consequently, it is understood from the above that, crosstalk is smaller than that in the comparative example. In the AWG optical multiplexer/demultiplexer 10 according to the present embodiment, the arrayed waveguide 28 is not fixed to the second glass plate 34 with the adhesive. Therefore, when ambient temperature rises or falls, distortion of the arrayed waveguide 28 generated due to a difference between a linear expansion coefficient of the second waveguide chip 16B and a linear expansion coefficient of the second glass plate 34 is able to be suppressed.

As explained above, when the temperature changes, the light collecting position by the input slab waveguide 22 changes, but the separated slab waveguide 22A moves relatively to the separated slab waveguide 22B due to expansion or contraction of the compensation plate 18 to correct the light collecting position. Therefore, even if the temperature changes, when used as a multiplexer, plural optical signals having the same wavelengths ($\lambda 1$ to $\lambda n$) as those ($\lambda 1$ to $\lambda n$) of input plural signals are able to be taken out having been multiplexed, from the input waveguide 20, and when used as a demultiplexer, a multiplexed optical signal ($\lambda 1$ to $\lambda n$) is demultiplexed into individual wavelengths to be output from the output waveguide 24. Consequently, temperature dependency of the transmission center wavelength is able to be compensated.

By fixing the compensation plate 18 to the first glass plate 32 and the second glass plate 34, forms of the first waveguide chip 16A and the second waveguide chip 16B are determinable without taking into consideration the space for adhering the compensation plate 18.

The legs 18A of the compensation plate 18 are adherable to the first glass plate 32 and the second glass plate 34 in a short period of time by using an ultraviolet cure adhesive to adhere the legs 18A of the compensation plate 18 to the first glass plate 32 and the second glass plate 34.

In the first glass plate 32 and the second glass plate 34, because the ultraviolet cure adhesive is cured by irradiating ultraviolet light from a surface opposite to a surface on which the compensation plate 18 is mounted, a relative displacement between parts is suppressible.

As described above, the second waveguide chip 16B is fixed to the second glass plate 34 at a part excluding the arrayed waveguide 28 formed on the second waveguide chip 16B. Therefore, when ambient temperature rises or falls, distortion of the arrayed waveguide 28 generated due to a difference between a linear expansion coefficient of the second waveguide chip 16B and a linear expansion coefficient of the second glass plate 34 is suppressed. By suppressing distortion of the arrayed waveguide 28 in this way, a low noise level is stably obtained and crosstalk is suppressible even if the temperature changes.

By cutting the plural AWGs 14 formed on the one wafer 11 into curved-line shapes following the outlines of the AWGs 14, the external form of the waveguide chip 16 becomes boomerang-shaped, and thus the number of the waveguide chips 16 taken per wafer is able to be increased as compared to the conventional technique.

By fixing the compensation plate 18 to the first glass plate 32 and the second glass plate 34 such that a long side of the compensation plate 18 becomes parallel to a longitudinal direction of the cut plane 30, the separated slab waveguide 22A moves relatively to the separated slab waveguide 22B along the cut plane 30. In this way, by moving the divided separated slab waveguide 22A relatively to the separated slab waveguide 22B along the cut plane 30, a light collecting position of the input slab waveguide 22 is accurately correctable.

The waveguide chip 16 is cut along the cut plane 30 in a direction orthogonal to an optical axis (a center line) at the input slab waveguide 22 portion. Consequently, the first waveguide chip 16A and the second waveguide chip 16B move relatively to a direction orthogonal to an optical axis, and thus it is possible to correct the light collecting position of the input slab waveguide 22 accurately.

By making an external form of the waveguide chip 16 boomerang-shaped, cut lines do not remain on the chip as compared to a case where cutting is performed using a dicing device. Therefore, the machine characteristics of the waveguide chip 16 against shocks and vibrations are able to be improved.

While a specific embodiment of the present invention has been explained above in detail, the present invention is not limited thereto, and it is obvious to those skilled in the art that various other embodiments are possible within the scope of the present invention. For example, in the above embodiment, although an external form of the waveguide chip 16 is cut using $CO_2$ laser, the present invention is not limited thereto, and the chip may be cut using various lasers or water-jets.

In the above embodiment, by cutting the input slab waveguide 22 portion together with the silicon substrate 12 in a direction orthogonal to an optical axis (a center line) of the input slab waveguide 22, the division into the first waveguide chip 16A and the second waveguide chip 16B is performed, but the present invention is not limited thereto, and cutting may be performed in a direction oblique to the optical axis (center line) of the input slab waveguide 22.

In the above embodiment, while a quartz glass plate is used as a substrate to which the first waveguide chip 16A and the second waveguide chip 16B are adhered, the present invention is not limited thereto, and other materials may be used as far as the length of the compensation plate 18 is determined considering the linear expansion coefficient of the material to be adhered.

The adhesion area of the first glass plate 32 and the first waveguide chip 16A, the adhesion area of the second glass plate 34 and the second waveguide chip 16B, and the position to adhere the compensation plate 18 are not limited to those illustrated in FIGS. 1A and 1B, as long as the positions of the cut slab waveguides are relatively changeable by expansion and contraction of the compensation plate 18.

Although as the above embodiment, the example in which one end of the compensation plate 18 is fixed to the first glass plate 32 has been explained, the present invention is not limited thereto, and the one end of the compensation plate 18 may be fixed to the first waveguide chip 16A.

Although as the above embodiment, the example in which the other end of the compensation plate 18 is fixed to the second glass plate 34 has been explained, the present invention is not limited thereto, and the other end of the compensation plate 18 may be fixed to the second waveguide chip 16B with the shape of the compensation plate 18 or the second waveguide chip 16B being changed.

In the above embodiment, as one example, the compensation plate 18 is fixed to the first glass plate 32 and the second glass plate 34 by using an ultraviolet cure adhesive, but other adhesion methods (fixing methods) may be used, not being particularly limited to the ultraviolet cure adhesive.

According to an embodiment of the present invention, a light collecting position by the first slab waveguide changes when the temperature changes. However, as the compensation member having one side fixed to the first base or the first waveguide chip and the other side fixed to the second base expands and contracts due to the temperature change, the first base and the second base move relatively to each other. The first waveguide chip fixed to the first base and the second waveguide chip move relatively to each other along the cut plane to correct the light collecting position.

As a result, an optical signal of the same wavelength is taken out from the input waveguide or the output waveguide of the arrayed waveguide grating even if the temperature changes.

By separately providing the first base and the second base separated from the first base without considering the space for adhering the compensation member, shapes of the first waveguide chip and the second waveguide chip are determinable.

According to yet another embodiment of the present invention, external forms of the first waveguide chip and the second waveguide chip become small, and many waveguide chips are able to be taken from one wafer as compared to waveguide chips having a rectangular external form.

According to yet another embodiment of the present invention, by making the longitudinal direction of the compensation plate having an elongated shape, such as a rectangular shape, a slot shape, or an oval shape, parallel to the direction in which the cut surfaces of the divided first slab waveguide extend, the first base and the second base move relatively to each other due to the expansion and contraction of the compensation plate. The first waveguide chip fixed to the first base and the second waveguide chip move relatively to each other along the cut surfaces.

Accordingly, by relatively moving the first waveguide chip along the cut surface of the second waveguide chip, it is possible to accurately correct a light collecting position of the first slab waveguide.

According to yet another embodiment of the present invention, in the first and second bases, by irradiating ultraviolet light to the parts to be adhered between the compensation member and the first and second bases from the surface opposite to the surface on which the compensation member is mounted, the ultraviolet cure adhesive is cured and the compensation member and the first and second bases are fixed together.

In this manner, in the first and second bases, because the ultraviolet cure adhesive is cured by irradiating ultraviolet light from the surface opposite to the surface on which the compensation member is mounted, it is possible to suppress relative displacement between the parts.

According to yet another embodiment of the present invention, because the arrayed waveguide is not fixed to the second base, it is possible to suppress distortion of the arrayed waveguide due to the difference between the linear expansion coefficient of the waveguide chip and the linear expansion coefficient of the second base when the temperature changes. By suppressing the distortion of the arrayed waveguide like this, low noise level is stably obtained and crosstalk is able to be suppressed, even if the temperature changes.

According to yet another embodiment of the present invention, by cutting the first slab waveguide in a direction orthogonal to the optical axis, if the temperature changes, due to expansion or contraction of the compensation plate, the first and second bases move relatively to each other in a direction orthogonal to the optical axis. Accordingly, the first waveguide chip fixed to the first base and the second waveguide chip move relatively to each other in the direction orthogonal to the optical axis.

In this manner, by relatively moving the first waveguide chip and the second waveguide chip to the direction orthogonal to the optical axis, designing becomes easier and the light collecting position of the first slab waveguide is accurately correctable as compared to the configuration in which the first slab waveguide is cut obliquely to the optical axis.

According to the present invention, the form of a waveguide chip is determinable without taking into consideration any space for adhering a compensation member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An arrayed-waveguide-grating-type optical multiplexer/demultiplexer, comprising:
    a waveguide chip including a first waveguide chip and a second waveguide chip that are divided by a cut plane and obtained by cutting, together with a substrate, in a direction crossing an optical axis, a first slab waveguide of an arrayed waveguide grating including the first slab waveguide and a second slab waveguide that are formed on the substrate, an external form of the waveguide chip being curved-line shaped following an outline of the arrayed waveguide grating formed on the substrate;
    a first base to which the first waveguide chip is fixed;
    a second base separated from the first base and to which the second waveguide chip is fixed; and
    a compensation member that has one end fixed to the first base or the first waveguide chip and another end fixed to the second base, in a state in which a cut surface of the first waveguide chip and a cut surface of the second waveguide chip face each other, and that is configured to move the first base and the second base relatively to each other along the cut plane by expanding or contracting when temperature changes.

2. The arrayed-waveguide-grating-type optical multiplexer/demultiplexer according to claim 1, wherein
    the compensation member is an elongated metal plate, and
    the compensation plate is fixed to the first base and the second base such that a longitudinal direction of the compensation plate becomes parallel to a direction in which the cut surface of the divided first slab waveguide extends.

3. The arrayed-waveguide-grating-type optical multiplexer/demultiplexer according to claim 1, wherein
    the first base and the second base are formed of a glass plate, and
    the compensation member is fixed to the first base and the second base with an ultraviolet cure adhesive that is cured by irradiation of ultraviolet light.

4. The arrayed-waveguide-grating-type optical multiplexer/demultiplexer according to claim 1, wherein
    the second waveguide chip includes an arrayed waveguide that connects the first slab waveguide to the second slab waveguide by a plurality of optical paths, and
    the arrayed waveguide is not fixed to the first base and the second base.

5. The arrayed-waveguide-grating-type optical multiplexer/demultiplexer according to claim 1, wherein the first slab waveguide is cut in a direction orthogonal to the optical axis to be divided.

6. An arrayed-waveguide-grating-type optical multiplexer/demultiplexer, comprising:
    a waveguide chip including a first waveguide chip and a second waveguide chip that are divided by a cut plane and obtained by cutting, together with a substrate, in a direction crossing an optical axis, a first slab waveguide of an arrayed waveguide grating including the first slab waveguide and a second slab waveguide that are formed on the substrate, an external form of the waveguide chip being curved-line shaped following an outline of the arrayed waveguide grating formed on the substrate;
    a first base to which the first waveguide chip is fixed;
    a second base separated from the first base and to which the second waveguide chip is fixed; and
    a compensation member that has one end fixed to the first base and another end fixed to the second base or the second waveguide chip, in a state in which a cut surface of the first waveguide chip and a cut surface of the second waveguide chip face each other, and that is configured to move the first base and the second base relatively to each other along the cut plane by expanding or contracting when temperature changes.

7. The arrayed-waveguide-grating-type optical multiplexer/demultiplexer according to claim 6, wherein
    the compensation member is an elongated metal plate, and
    the compensation plate is fixed to the first base and the second base such that a longitudinal direction of the compensation plate becomes parallel to a direction in which the cut surface of the divided first slab waveguide extends.

8. The arrayed-waveguide-grating-type optical multiplexer/demultiplexer according to claim 6, wherein
    the first base and the second base are formed of a glass plate, and the compensation member is fixed to the first base and the second base with an ultraviolet cure adhesive that is cured by irradiation of ultraviolet light.

9. The arrayed-waveguide-grating-type optical multiplexer/demultiplexer according to claim 6, wherein the second waveguide chip includes an arrayed waveguide that connects the first slab waveguide to the second slab waveguide by a plurality of optical paths, and the arrayed waveguide is not fixed to the first base and the second base.

10. The arrayed-waveguide-grating-type optical multiplexer/demultiplexer according to claim 6, wherein the first slab waveguide is cut in a direction orthogonal to the optical axis to be divided.

* * * * *